United States Patent [19]

Antos et al.

[11] Patent Number: 5,278,931
[45] Date of Patent: Jan. 11, 1994

[54] LOW BEND LOSS SINGLEMODE OPTICAL WAVEGUIDE FIBER

[75] Inventors: A. Joseph Antos, Elmira; David K. Smith, Painted Post, both of N.Y.

[73] Assignee: Corning Incorporated, Corning, N.Y.

[21] Appl. No.: 999,737

[22] Filed: Dec. 31, 1992

[51] Int. Cl.$^5$ ............................................. G02B 6/22
[52] U.S. Cl. .................................... 385/126; 385/127
[58] Field of Search ............... 385/124, 123, 126, 127, 385/128, 141, 142, 143, 144, 145

[56] References Cited

U.S. PATENT DOCUMENTS

| | | | |
|---|---|---|---|
| 4,715,679 | 12/1987 | Bhagavatula | 350/96.33 |
| 4,877,304 | 10/1989 | Bhagavatula | 385/124 |
| 5,032,001 | 7/1991 | Shang | 385/124 |
| 5,111,525 | 5/1992 | Hartouni | 385/126 |

OTHER PUBLICATIONS

Miya et al., "VAD Single-Mode Fiber Fabrication Techniques-1.5 μm Dispersion-Free Single-Mode Fibers", Review of Elec. Comm. Laboratories, vol. 32, No. 3, pp. 411-417, 1984.

Lapp et al., "Segmented-Core Single-Mode Fiber Optimized for Bending Performance", J. of Lightwave Tech., vol. 6, No. 10, pp. 1462-1465, Oct. 1988.

*Primary Examiner*—Rodney B. Bovernick
*Assistant Examiner*—John Ngo
*Attorney, Agent, or Firm*—Bruce E. Kamerer

[57] ABSTRACT

An optical waveguide fiber with improved bend loss performance while maintaining cutoff wavelength, $\lambda_c$, and zero dispersion wavelength, $\lambda_0$, in practical operating ranges. The fiber includes an inner core region with a refractive index delta higher than the rest of the core and a reduced diffusion tail at the core/cladding interface. Optionally, a ring at the outer portion of the core is provided to compensate for increased $\lambda_0$ which results from the higher inner core refractive index delta. This ring also contributes to the reduced diffusion tail at the core/cladding interface.

13 Claims, 4 Drawing Sheets

LOW BEND LOSS SINGLEMODE OPTICAL WAVEGUIDE FIBER

BACKGROUND OF THE INVENTION

This invention relates to a singlemode optical waveguide fiber with improved bend performance.

Bend loss is a phenomenon in which a portion of the light travelling through an optical waveguide fiber is lost due to physical bending of the fiber. Part of the light travelling through the core region of a fiber is stripped off at a bend in the fiber, causing that light to be lost. A discussion of bend loss can be found in Miller et al., Optical Fiber Communications, pp. 62-65, pp. 92-98, pp. 158-161, Academic Press, New York, 1979.

Bend loss is particularly a problem for applications using ribbon cables. A ribbon sub-unit is a linear array of individual optical fibers contained in a protective sheathing. A number of these ribbon sub-units may be stacked and placed into a larger cable sheath along with strength members to form a ribbon cable. Ribbon cables are extremely space efficient and can contain a large number of fibers. Typically, 4 to 16 fibers are in a ribbon sub-unit, and 12 to several hundred ribbon sub-units are combined to form a ribbon cable.

Because of the arrangement of a large ribbon cable, the outside fibers (edge fibers) in each individual ribbon subunit may be exposed to large bends or twists during fabrication of the individual ribbon sub-unit or of the larger combination of individual ribbon sub-units in cables, or during installation of the finished cable. The bends in the fibers within a ribbon cable may result in large bend losses if the optical fibers are bend sensitive. If the fibers exhibit large bend losses, the system using such fibers will exhibit higher losses. This is especially problematic in situations where the optical power budget (the amount of loss allowable) is tight. Also, because bending of an individual fiber is unpredictable and inconsistent, the amount of bend loss from fiber to fiber may differ substantially.

The bend loss of a singlemode optical fiber is determined by its mode field diameter, MFD, and cutoff wavelength, $\lambda_c$. As illustrated in FIG. 1, the ratio of MFD/$\lambda_c$ can be used as an indicator of the bend loss of the fiber. Decreasing MFD will result in more concentration of the optical power distribution in the center of the fiber. This concentration of optical power results in less optical power which can be lost at a fiber bend, thereby reducing the bend loss.

Increasing $\lambda_c$ will also reduce the amount of power which will be lost at a bend for a given power distribution. Because an optical waveguide fiber must be single mode at about 1310 nm, $\lambda_c$ cannot be raised much above 1320 nm. Therefore, significant improvement in bend loss can result only from lowering MFD.

Raising the refractive index delta, $\Delta$, in the core region of the fiber is well known in the art as a method for decreasing the MFD. However, raising A in the core region can result in an unacceptable increase in $\lambda_c$ or an unacceptable increase in the zero dispersion wavelength, $\lambda_0$, at 1310 nm. one known method for maintaining $\lambda_c$ while decreasing MFD is simultaneously to increase core A and reduce the radius of the core region. This will result in an unacceptable increase in $\lambda_0$. Also, raising the core $\Delta$ in a step index profile is more difficult to manufacture and may cause higher attenuation in the fiber as a result of increased Rayleigh scattering caused by the higher dopant concentrations required to raise the refractive index.

There is a shallow manufacturing window in which MFD, $\lambda_c$ and $\lambda_0$, are within acceptable ranges. For practical applications, MFD should be below about 9.8 $\mu$m, $\lambda_c$ should be between about 1200 and 1320 nm, and $\lambda_0$ should be between about 1301 and 1321 nm. Varying core $\Delta$ in a step index profile singlemode optical fiber readily moves one outside this manufacturing window such that $\lambda_c$ and $\lambda_0$ are no longer within acceptable ranges.

Bhagavatula U.S. Pat. No. 4,715,679 discloses numerous refractive index profiles which include a core with inner and outer regions separated by at least one region of depressed refractive index. Bhagavatula further discloses that by altering the radial location, width, depth and shape of this region of depressed refractive index, fibers can be designed with specific waveguide dispersion characteristics. Bhagavatula also discloses that if the core radius is made too small in order to balance out material dispersion, unacceptably high microbending losses will occur. Bhagavatula only discloses inner core regions with diameters greater than 40%. There is no disclosure in Bhagavatula regarding a diffusion tail between the core and cladding regions of the fiber.

Nakahara et al. Japanese Patent Application No. 51-134138 discloses a singlemode optical fiber with a refractive index profile in the core region that includes a refractive index maximum at both the center and circumference of the core. Nakahara et al. discloses that this core refractive index profile allows the core diameter to be made larger, allowing for easier splicing. Making the core diameter larger will increase the MFD of the fiber, resulting in higher bend losses.

Kawana et al. Japanese Patent Application No. 53-97849 discloses a singlemode optical fiber with a refractive index in the center of the core region which is higher than the refractive index of the outer portion of the core region. Kawana discloses that the radius of the center of the core region is less than 50% of the core radius to limit the increase to $\lambda_c$. The benefits disclosed include lower losses as a result of less leakage of electromagnetic field into the clad portion of the fiber and lower bend losses. There is no disclosure in Kawana et al. regarding the effects of the profile design on MFD or $\lambda_0$. There is also no disclosure in Kawana et al. regarding a reduced germania diffusion tail at the interface between the core and cladding regions or any ring of increased delta at the outermost edge of the core region.

Reed U.S. Pat. No. 4,852,968 discloses another method for achieving reduced bending losses in singlemode optical waveguide fibers. Reed discloses a singlemode optical fiber with a core region, a first cladding region surrounding the core region, a trench region surrounding the first cladding region, and a second cladding region surrounding the trench region. The refractive index of the trench region is lower than the refractive indices of the first and second cladding regions. Reed discloses that the presence of the trench region results in lower bending losses as compared to fibers without the trench region. However, producing fibers with several cladding regions of different refractive indices increases the cost and complexity of producing such fibers as compared to fibers with a single core region and a uniform cladding profile.

J. C. Lapp et al., "Segmented-Core Single-Mode Fiber Optimized for Bending Performance", J. of Lightwave Technology, vol. 6, no. 10, pp. 1462-65, October 1988, discloses a fiber with a segmented-core profile of the type disclosed in Bhagavatula U.S. Pat. No. 4,715,679. The profiles in Lapp et al. are optimized to improve bend performance. The segmented-core profile of Lapp et al. consists of: i) an inner core region of high delta, ii) an intermediate core region of depressed delta, and iii) an outer core region of high delta. Lapp et al. discloses deltas for the inner and outer core regions ranging from 0.4 to 0.5% and delta for the intermediate region of 0.1 to 0.2%. Lapp et al. further discloses diameters of the inner core region of about 70 to 90% of the diameter of the entire core region of the fiber and thicknesses of the intermediate core region of depressed delta in the range of about 0.2 to 1.0 μm. As will be discussed further in the present application, $\lambda_c$ is increased dramatically when the diameter of the inner core region is greater than about 60% of the diameter of the entire core region of the fiber. Also, it would be difficult to repeatably manufacture fiber with the profile disclosed in Lapp et al. because of the tight dimensional control required for the narrow intermediate core region of depressed cladding. Poor control of the delta in the intermediate core region results, in part, from diffusion of dopant materials from both the inner and outer core regions caused by the higher concentrations of dopants in those two regions relative to the intermediate core region. There is no disclosure or suggestion in Lapp et al. regarding a diffusion tail between the core and cladding regions of the fiber.

SUMMARY OF THE INVENTION

It is an object of the present invention to provide a singlemode optical waveguide fiber in which the bend loss performance of the fiber is improved while maintaining the cutoff wavelength, $\lambda_c$, and the zero dispersion wavelength, $\lambda_0$, within ranges used for telecommunications applications.

It is a further object of the present invention to provide a more easily manufactured singlemode optical waveguide fiber in which the bend loss performance of the fiber is improved while maintaining the cutoff wavelength, $\lambda_c$, and the zero dispersion wavelength, $\lambda_0$, within ranges used in telecommunications applications.

In order to achieve these and other objects, a singlemode optical waveguide fiber is provided in which the refractive index delta of the inner core region is higher than the refractive index delta of the outer core region and in which there is a reduced diffusion tail at the interface between the outer core region and the cladding region of the fiber. In one embodiment, the diameter of the inner core region is less than about 60% of the diameter of the entire core region of the fiber. An optional aspect of the fiber of the present invention is a ring at the outermost edge of the outer core region in which the refractive index delta is higher than the remainder of the outer core region.

DETAILED DESCRIPTION

Figure 1:
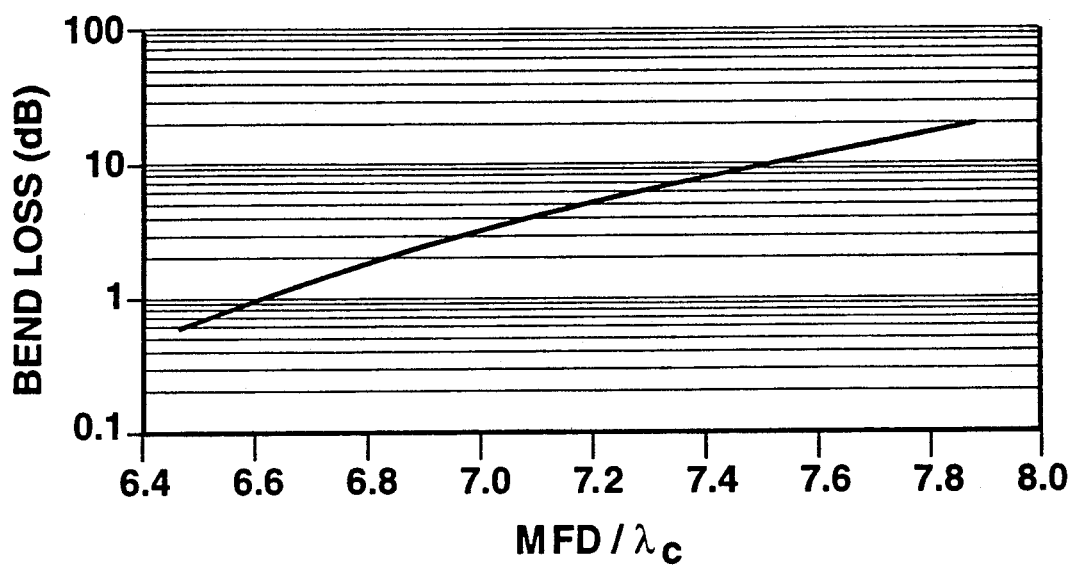
FIG. 1 graphically represents the relationship between bend loss and the ratio of MFD to $\lambda_c$.

FIG. 1 illustrates the calculated bend performance as a function of the ratio of MFD to $\lambda_c$. The bend performance shown in FIG. 1 is a calculated value of pin array bend loss. For a complete discussion of the pin array bend loss measurement, see J. A. Dixon et al., "Bending and Microbending Performance of Single-mode optical Fibers", OFC/IOOC 187 Technical Digest, paper TUA2, page 40, 1987. As FIG. 1 indicates, bend loss increases with increased MFD/$\lambda_c$. Since $\lambda_c$ cannot be raised much above 1320 nm to maintain singlemode performance at 1310 nm, MFD must be decreased to improve bend performance. The bend loss for a typical singlemode optical fiber is about 8 dB. The preferred bend loss for a fiber made according to the present invention is less than 3 dB.

Figure 2:
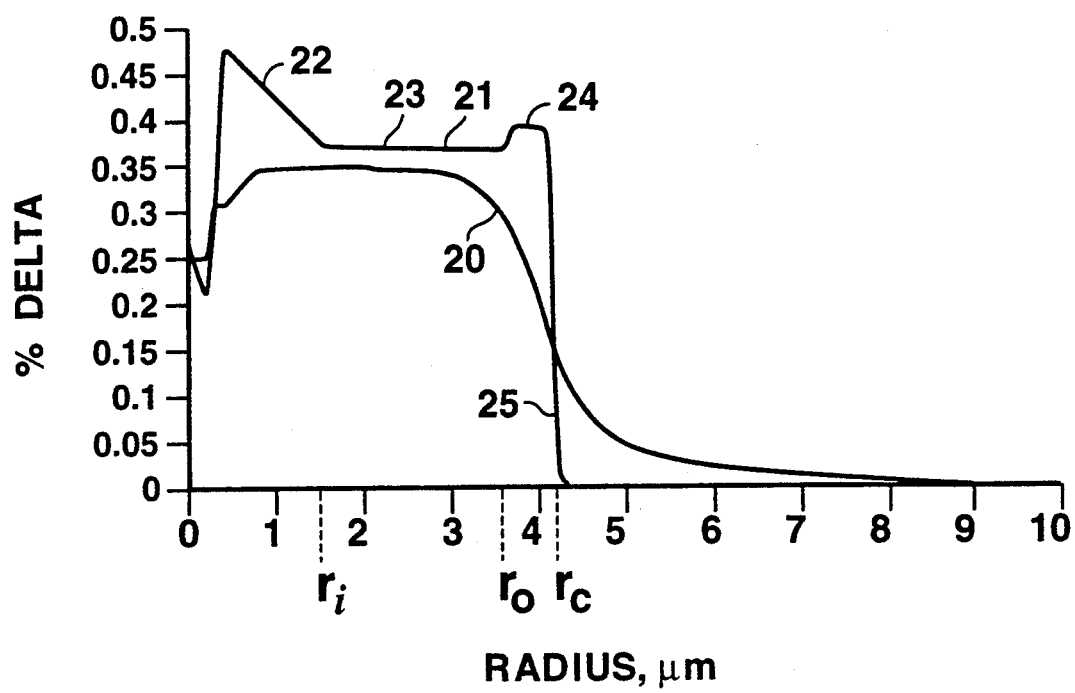
FIG. 2 illustrates the refractive index profiles for a fiber according to the present invention and a step index singlemode fiber.

FIG. 2 shows the refractive index profiles for a step index singlemode optical waveguide fiber (curve 20) and a low bend loss singlemode optical waveguide fiber made according to the present invention (curve 21). FIG. 2 shows the %Δ as a function of the radius of the fiber. %Δ is the percentage difference in the refractive index of the core region relative to the refractive index of the cladding region.

The step index singlemode fiber profile illustrated by curve 20 of FIG. 2 includes a roughly constant %Δ for the entire core radius, $r_c$. The step index singlemode fiber profile also indicates a diffusion tail at the interface between the core and cladding regions of the fiber. This diffusion tail is caused by the diffusion of dopants between the core region and the cladding region during manufacture and is difficult to avoid in all fiber manufacturing processes. An $SiO_2$-based fiber typically contains $GeO_2$ in the core region to increase the refractive index of the core region relative to the refractive index of the $SiO_2$ cladding region. A portion of the $GeO_2$ near the interface of the core and cladding regions may diffuse from the core region into the cladding region during the manufacture of the fiber. This diffusion will increase the refractive index of the portion of the cladding region near the interface between the core and cladding regions. The dip in %Δ near the center of the fiber is an artifact of the process used to manufacture the fiber.

The inventive low bend loss profile shown by curve 21 in FIG. 2 includes an inner core region 22 of increased %Δ (out to a radius $r_i$), an outer core region 23 (out to a radius of $r_o$), an optional ring 24 of increased %Δ (from $r_o$ to $r_c$), and a reduced diffusion tail 25 at the interface between the core and cladding regions. $r_c$ is defined as the point near the interface between the core and cladding regions at which the refractive index Δ reaches a value equal to one-half the outer core refractive index delta, excluding any ring refractive index delta, for fibers made according to the present invention. Higher %Δ in the inner core region decreases MFD with only a slight increase (about 3 nm) in $\lambda_c$. While the inner core delta is shown in FIG. 2 as decreasing approximately linearly, inner core delta may be constant or may be reduced other than linearly. Decreasing the inner core delta to form such a gradient profile is preferred because such a profile design is easier to manufacture. The reduced diffusion tail lowers $\lambda_c$. The optional ring of higher %Δ at the outer edge of the core region is used to counteract an increase in $\lambda_0$ resulting from the waveguide dispersion caused by the increased %Δ in the inner core region. The dip in %Δ near the center of the fiber is an artifact of the outside vapor deposition (OVD) process used to manufacture the fiber and is inconsequential to the present invention.

The effect on other optical parameters of changing MFD is best illustrated through the use of an optical property map. An optical property map characterizes a given refractive index profile shape and shows $\lambda_c$ as a function of MFD at a series of $\lambda_0$ values. An optical property map is generated by calculating the optical properties with at least three core radii and at least three Δ's. An empirical model of the relationships among properties is created with multiple regression that includes third order terms. The property map is generated from the empirical model.

Figure 3:
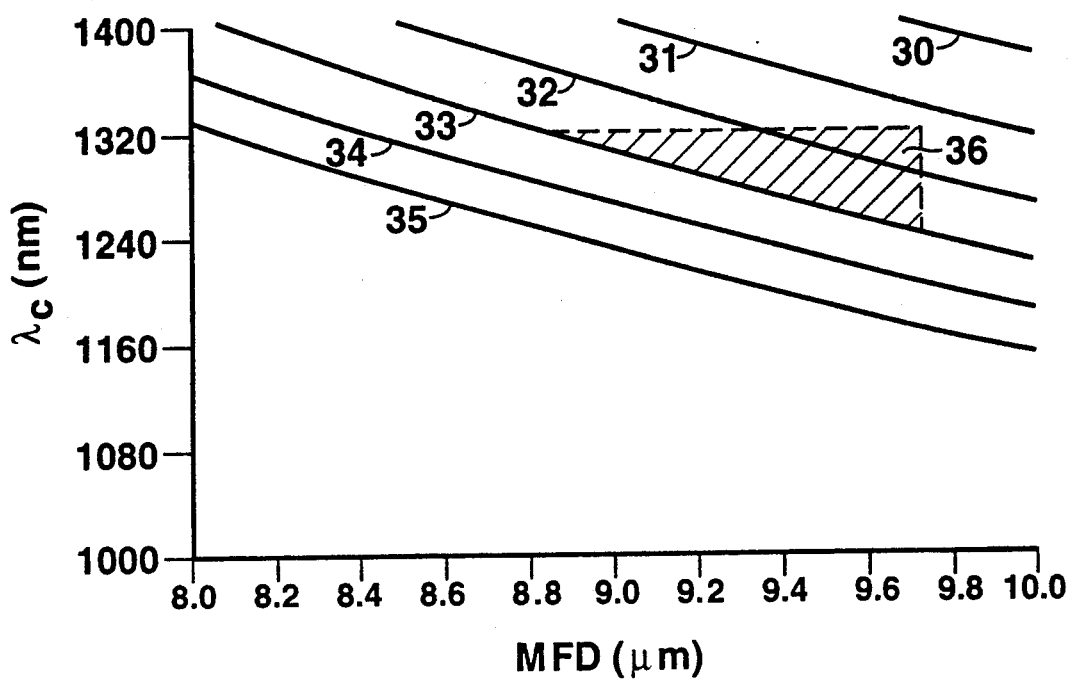
FIG. 3 is an optical property map of a step index singlemode optical waveguide fiber.

FIG. 3 is an optical property map for a step index singlemode profile as shown by curve 20 of FIG. 2. FIG. 3 shows $\lambda_c$ as a function of MFD. Diagonal lines 30–35 represent $\lambda_0$ ranging from 1305 nm to 1330 nm in 5 nm increments. Shaded area 36 represents the "window" within which MFD, $\lambda_c$ and $\lambda_0$ are within acceptable ranges. The horizontal dashed line represents $\lambda_c$ equal to 1320 nm, diagonal line 33 represents $\lambda_0$ equal to 1320 nm, and the vertical dashed line represents MFD equal to 9.75 μm (the MFD value above which bend loss is unacceptably high). Shaded area 36 indicates that there is a relatively small working range if practical singlemode attributes are to be maintained in the resulting fiber. As noted earlier, it is known that a low bend loss singlemode fiber may be produced by simultaneously increasing Δ in the core region while decreasing the radius of the core region. This working range does not include a property regime with MFD values below 8.8 μm, which prevents the manufacture of low bend loss singlemode fiber with a step index refractive index profile.

Figure 4:
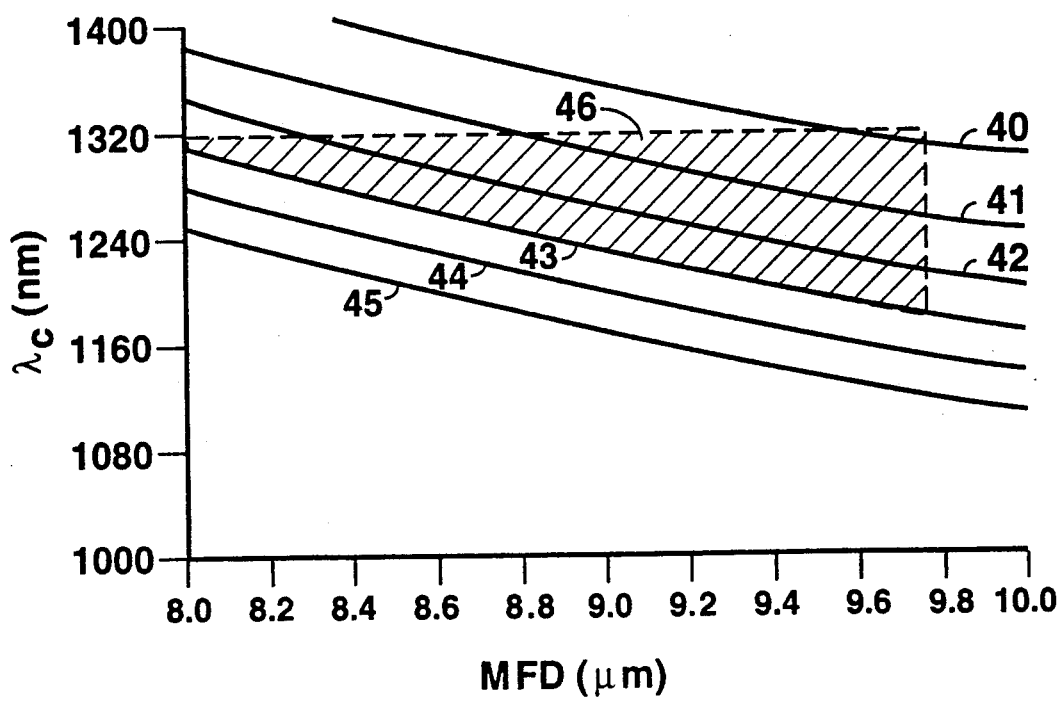
FIG. 4 is an optical property map of a fiber according to the present invention.

FIG. 4 shows the optical property map for a low bend loss singlemode fiber with the inventive refractive index profile shape as indicated by curve 21 of FIG. 2. Diagonal lines 40–45 represent $\lambda_0$ ranging from 1305 nm to 1330 nm in increments of 5 nm. Shaded area 46 represents the "window" within which MFD, $\lambda_c$ and $\lambda_0$ are within acceptable ranges. The horizontal dashed line represents $\lambda_c$ less than 1320 nm, diagonal line 33 represents $\lambda_0$ less than 1320 nm, and the vertical dashed line represents MFD less than 9.75 μm. This is a relatively large working range within which practical singlemode attributes are maintained while improving the bend loss performance of the fiber, as compared to the step index singlemode fiber property map of FIG. 3. This working range makes the manufacture of low bend loss singlemode fibers possible by using the profile design of the present invention because this working range includes a property regime with MFD values below 8.8 μm.

Figure 8:
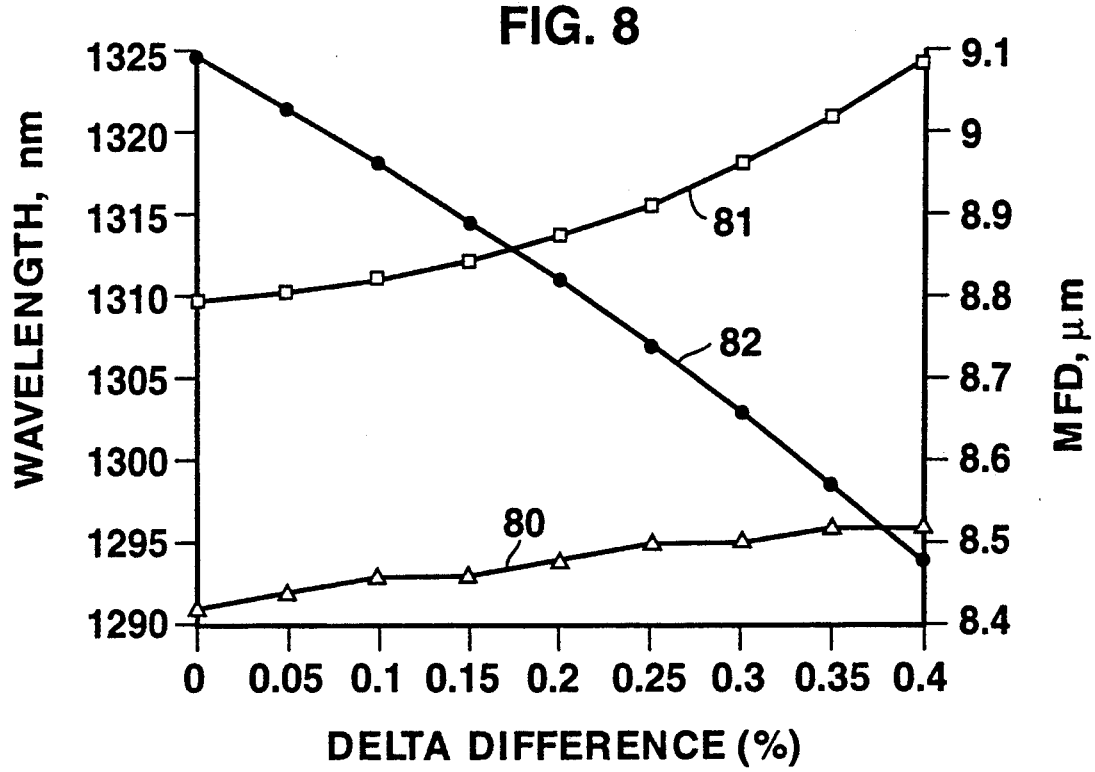
FIG. 8 shows $\lambda_c$, $\lambda_0$, and MFD as a function of delta difference between the peak inner core delta and the outer core delta.

The effect of the peak inner core delta on the optical properties of a fiber made according to the present invention is shown in FIG. 8. The x-axis of FIG. 8 shows delta difference, the difference between the peak inner core delta and the outer core delta between $r_i$ and $r_o$. Curve 80 shows $\lambda_c$, curve 81 shows $\lambda_0$, and curve 82 shows MFD as functions of delta difference. Given that outer core delta is usually between 0.3 and 0.4%, FIG. 8 indicates that delta difference should be at most about 0.324 to maintain $\lambda_0$ below 1320 nm. This translates into a maximum for peak inner core delta of about 0.7%, with 0.5 to 0.65% being preferred.

Figure 5:
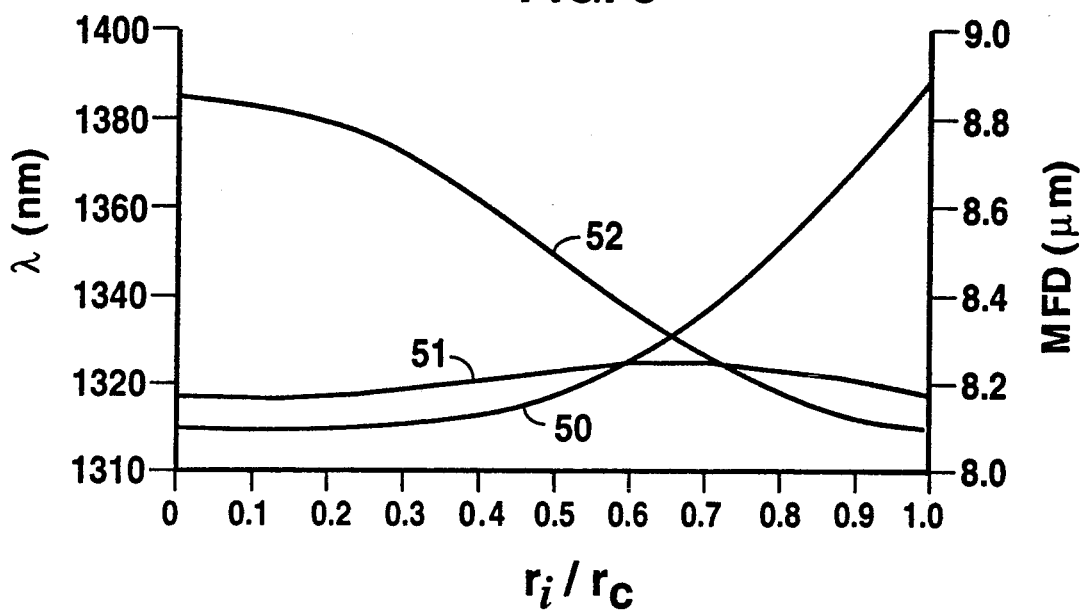
FIG. 5 shows $\lambda_c$, $\lambda_0$ and MFD as a function of inner core radius for a fiber according to the present invention.

The diameter of the inner core region also affects the optical properties. FIG. 5 shows how the optical properties change versus the relative width of the inner core region. The horizontal axis in FIG. 5 is the normalized width of the inner core region, i.e., the ratio of the radius of the inner core region, $r_i$, to the radius of the core, $r_c$. Curves 50, 51 and 52 show the change in $\lambda_c$, $\lambda_0$, and MFD, respectively, as a function of $r_i/r_c$. To avoid an unacceptable increase in $\lambda_c$, $r_i/r_c$ should be less than about 60%, as indicated by curve 50 of FIG. 5, with less than 40% being preferred and about 33% being most preferred. Curve 51 indicates that, for the profile design of the present invention, $\lambda_0$ is only slightly increased with increased inner core radius, $r_i$. Curve 52 indicates the dramatic change in MFD as a function of $r_i/r_c$.

Figure 7:
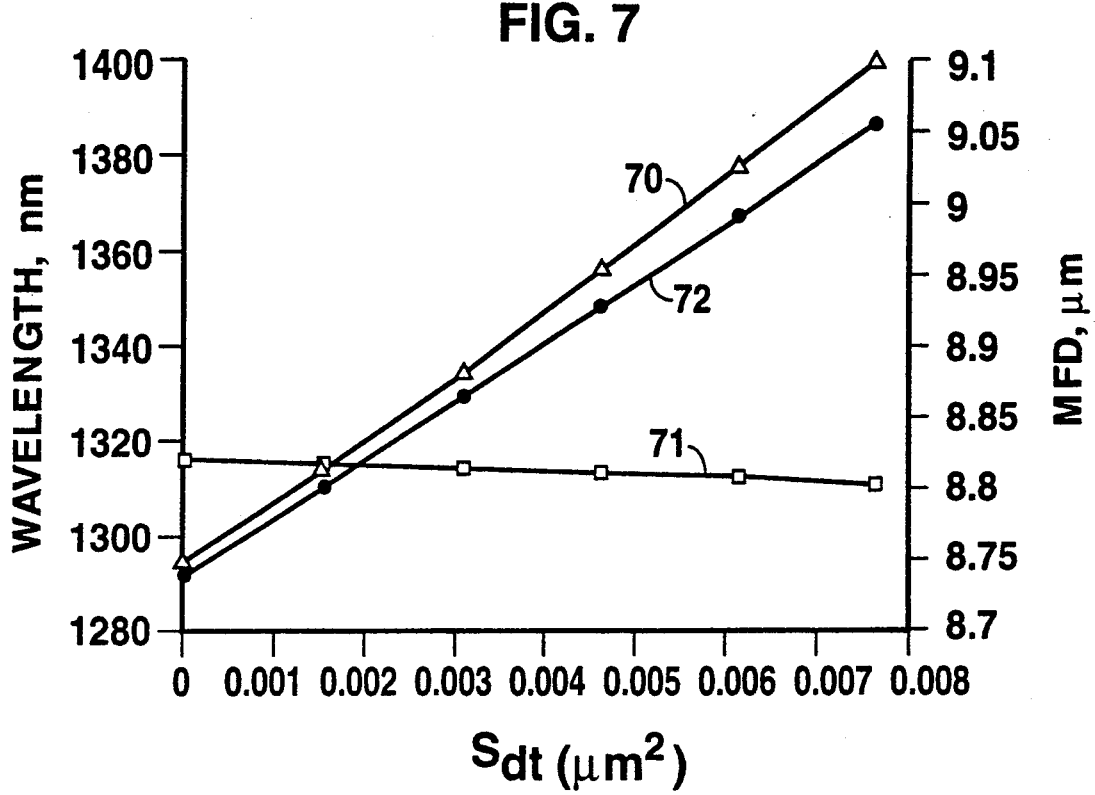
FIG. 7 shows $\lambda_c$, $\lambda_0$, and MFD as a function of the size of the diffusion tail.

The effect of the reduced diffusion tail is illustrated in FIG. 7 which shows $\lambda_c$ (curve 70), $\lambda_0$ (curve 71), and MFD (curve 72) as functions of diffusion tail size for a refractive index profile according to the present invention. Diffusion tail size can be defined as the delta area outside the outer core radius, $r_c$.

The size of the diffusion tail, $S_{dt}$, is then determined by the following equation:

$$S_{dt} = \int_{r_c}^{\infty} \Delta(r) dr \qquad (1)$$

As shown in FIG. 7, $\lambda_c$ increases about 100 nm for every 0.007 μm² of diffusion tail size. For profiles made according to the present invention, the manufacturing window within which $\lambda_c$, $\lambda_0$, and MFD are within acceptable ranges is about 90 nm of $\lambda_c$ wide at the widest point. Therefore, $S_{dt}$ should be no more than about 0.006 μm² and is preferably no more than about 0.003 μm².

Figure 6:
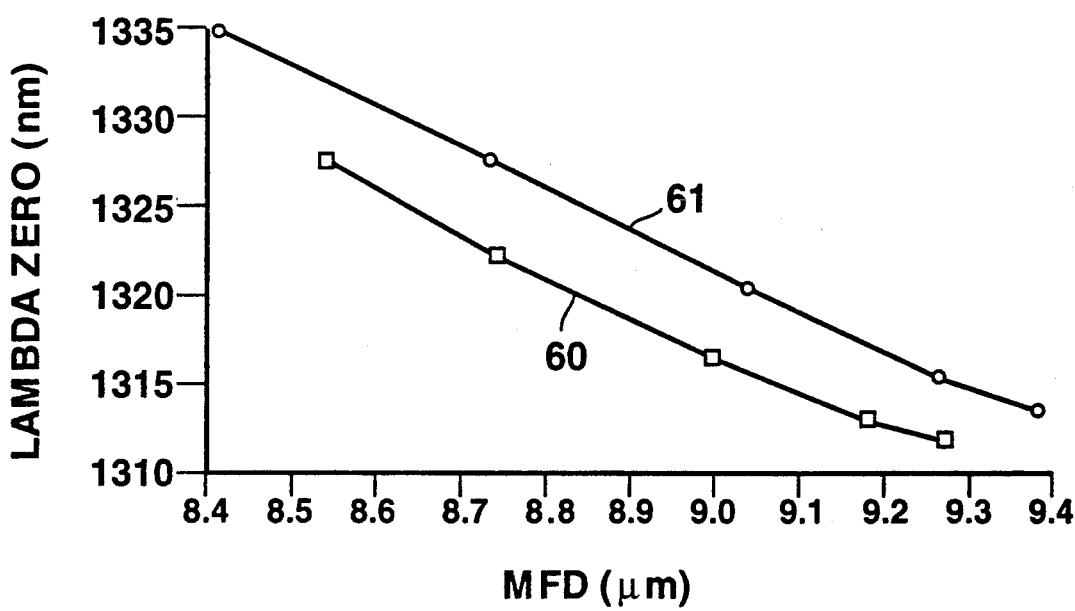
FIG. 6 shows $\lambda_0$ as a function of MFD for fibers according to the present invention with and without an optional higher Δ ring.

The effect of optional ring 24 as shown in FIG. 2 is illustrated in FIG. 6. FIG. 6 shows $\lambda_0$ as a function of MFD for a profile with optional ring 24 (curve 60) and without optional ring 24 (curve 61). As shown in FIG. 6, $\lambda_0$, at comparable MFD, is lower for a profile which includes optional ring 24 than for a profile without optional ring 24. Ring 24 partially adjusts for the increase in $\lambda_0$ which results from the increase of the inner core Δ. The width of ring 24 should be less than about 20% of $r_c$, with about 10% being preferred. The delta difference between the refractive index delta of ring 24 and the refractive index delta of outer core region 23 should be less than 0.1%, with 0.04% being preferred.

EXAMPLES

Table I shows a variety of examples of fiber profiles according to the present invention. The inner core delta is linearly decreased from the peak inner core Δ value shown in Table I down to the outer core Δ value shown in table I.

TABLE I

| Example # | 1 | 2 | 3 | 4 | 5 |
|---|---|---|---|---|---|
| Peak inner core Δ, % | 0.6 | 0.65 | 0.6 | 0.56 | 0.45 |
| Inner core radius, μm | 1.3 | 1.4 | 1.6 | 1.2 | 1.2 |
| Outer core Δ, % | 0.4 | 0.35 | 0.3 | 0.37 | 0.35 |
| Outer core radius, μm | 4 | 4.2 | 4.7 | 4.0 | 4.3 |
| Ring Δ, % | 0.44 | 0.385 | 0.33 | 0.43 | 0.4 |
| Ring width, μm | 0.5 | 0.5 | 0.5 | 0.7 | 0.7 |
| $\lambda_0$, nm | 1320 | 1320 | 1318 | 1316 | 1313 |
| MFD, μm | 8.19 | 8.56 | 9.14 | 8.2 | 8.7 |
| $\lambda_C$, nm | 1313 | 1315 | 1317 | 1300 | 1280 |
| Bend loss, dB | 0.19 | 0.64 | 2.86 | 0.4 | 1.5 |

Examples 1, 2 and 3 in Table I were modeled on a computer according to the present invention, and the values for $\lambda_0$, MFD, $\lambda_c$ and bend loss are calculated results based on the theoretical profile information. Examples 4 and 5 in Table I are fibers made according to the present invention, and the values for $\lambda_0$, MFD, $\lambda_c$ and bend loss shown in Table I are based on measurements made on the resulting fiber.

COMPARATIVE EXAMPLE

A singlemode fiber having a step index profile as shown by curve 20 of FIG. 2 was produced. The core %Δ was about 0.35, MFD was 9.37 μm, $\lambda_c$ was 1241 nm, and $\lambda_0$ was 1316 nm. Bend loss was about 8 dB.

The present invention has been particularly shown and described with reference to the preferred embodiments thereof. However, it will be understood by those skilled in the art that various changes may be made in the form and details of these embodiments without departing from the true spirit and scope of the invention as defined by the following claims.

We claim:

1. An optical waveguide fiber with a core region and a cladding region, wherein said core region further comprises an inner core region with a refractive index delta higher than an outer core region, wherein the size of a diffusion tail between said core and cladding regions is less than or equal to 0.006 μm², as determined by $$S_{dt} = \int_{r_c}^{\infty} \Delta(r) dr$$

where $r_c$ is the core radius as defined by the point at which the refractive index delta at the outermost edge of said core region is equal to one-half of the refractive index delta of said outer core region, and where $\Delta(r)$ is the refractive index delta as a function of the radius.

2. The optical waveguide fiber of claim 1, wherein $S_{dt}$ is less than or equal to 0.003 μm².

3. The optical waveguide fiber of claim 1, wherein the diameter of said inner core region is less than or equal to about 60% of the diameter of the core region.

4. The optical waveguide fiber of claim 3, wherein the diameter of said inner core region is about one-third the diameter of said core region.

5. The optical waveguide fiber of claim 1, wherein the maximum refractive index delta of said inner core region is less than about 0.7%.

6. The optical waveguide fiber of claim 5, wherein the maximum refractive index delta of said inner core region is between about 0.5% and 0.65%.

7. The optical waveguide fiber of claim 1, wherein said outer core region further comprises a ring at the interface between said outer core region and said cladding region, said ring having a higher refractive index delta than the remainder of said outer core region, and said ring being separated from said inner core.

8. The optical waveguide fiber of claim 7, wherein the refractive index delta of said inner core region is higher than the refractive index delta of said ring.

9. The optical waveguide fiber of claim 8, wherein the refractive index delta of said ring is less than about 0.1% higher than the refractive index delta of said outer core region.

10. The optical waveguide fiber of claim 9, wherein the refractive index delta of said ring is about 0.04% higher than the refractive index delta of said outer core region.

11. An optical waveguide fiber with a core region and a cladding region, wherein said core region further comprises an inner core region with a refractive index delta higher than an outer core region, the diameter of said inner core region being less than 40% of the diameter of said core region, and wherein the cutoff wavelength of said optical waveguide fiber, $\lambda_c$, is below 1320 nm, the zero dispersion wavelength of said optical waveguide fiber, $\lambda_0$, is below 1320 nm, and the bend loss of said optical waveguide fiber is below 3 dB.

12. The optical waveguide fiber of claim 11, wherein said outer core region further comprises a ring at the interface between said outer core region and said cladding region, said ring having a higher refractive index delta than the remainder of said outer core region, and said ring being separated from said inner core.

13. The optical waveguide fiber of claim 11, wherein the diameter of said inner core region is about one-third the diameter of said core region.

* * * * *

UNITED STATES PATENT AND TRADEMARK OFFICE
CERTIFICATE OF CORRECTION

PATENT NO. : 5,278,931
DATED : January 11, 1994
INVENTOR(S) : A. Joseph Antos et al It is certified that error appears in the above-indentified patent and that said Letters Patent is hereby corrected as shown below:

Column 1, line 59, "A" should read -- Δ --.

Column 1, line 64, "A" should read -- Δ --.

Column 4, line 20, "187" should read --'87--.
         line 46, "Geo$_2$" should read --GeO$_2$--.
Column 6, line 7, "0.324" should read --0.32%--.

Signed and Sealed this

Second Day of August, 1994

BRUCE LEHMAN

Attest:

Attesting Officer        Commissioner of Patents and Trademarks